United States Patent Office 3,083,203
Patented Mar. 26, 1963

3,083,203
METHOD FOR PREPARING N,N'-DIMETHYLTRI-ETHYLENEDIAMMONIUM DINITRATE
John G. Milligan, Austin, Tex., assignor to Jefferson Chemical Company, Inc., Houston, Tex., a corporation of Delaware
No Drawing. Filed June 1, 1960, Ser. No. 33,089
8 Claims. (Cl. 260—268)

This invention relates to N,N'-dimethyltriethylenediammonium dinitrate, and, in particular, to an improved method for preparing this compound. In addition, this invention is directed to the novel composition formed as an intermediate in the course of this process.

N,N'-dimethyltriethylenediammonium dinitrate is a complex compound represented by the formula:

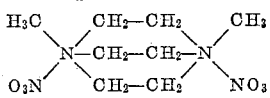

It has been prepared heretofore by reacting N,N'-dimethyltriethylenediammonium dibromide with silver nitrate resulting in the formation of the dinitrate and precipitation of silver bromide. This process, however, is prohibitively expensive for use as a commercial operation. N,N'-dimethyltriethylenediammonium dinitrate has also been prepared by the reaction of the corresponding dibromide with nitrate salts, such as lead nitrate and calcium nitrate. In general, these processes have proven to be unsatisfactory because double salts are formed which are difficult to convert to the desired dinitrate composition or because it has been too difficult to remove the metal ions.

An improved method has now been discovered which provides an efficient and economical means for producing N,N'-dimethyltriethylenediammonium dinitrate. The novel double salt of N,N'-dimethyltriethylenediammonium dinitrate-ammonium nitrate is formed in the first step of this process.

In accordance with this invention, an N,N'-dimethyltriethylenediammonium dihalide is reacted with an excess of ammonium nitrate in an organic solvent to form, as an intermediate reaction product, the double salt of N,N'-dimethyltriethylenediammonium dinitrate and ammonium nitrate. This reaction is expressed by the following formula:

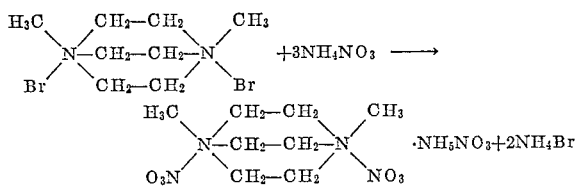

The double salt precipitate is separated by filtration and is reacted with an aliphatic amine which converts the double salt to N,N'-dimethyltriethylenediammonium dinitrate.

The two steps in this process are conducted with the reactants dissolved in a suitable solvent or reaction medium. The class of solvents found effective are the lower alaphatic alcohols having from 1 to 3 carbon atoms with methanol and ethanol being the preferred solvents. It has also been found desirable to modify the properties of the solvent by employing mixtures of the organic solvents or aqueous solutions thereof in which the amount of water may range from about 2% to about 10% by volume of the organic solvent or solvents employed. The amount of solvent employed is not critical but should be sufficient to maintain the reactants in solution at the same time allowing the product to precipitate.

Any of the N,N'dimethyltriethylenediammonium dihalides may be employed as the principal starting reactant in this reaction. The preferred halides are the dibromide and the dichloride.

An organic solution of ammonium nitrate is employed to react with the dihalide in the first step of this reaction. The amount of ammonium nitrate employed or the solution strength is not critical in this process. However, it has been found advantageous to employ 2 to 5 moles of ammonium nitrate per mole of the dihalide with the preferred proportions being in the range of 3 to 4 moles of ammonium nitrate. It is understood, of course, that the organic solvent employed to dissolve the ammonium nitrate is similar to that defined above and will not hinder or prevent precipitation of the double salt.

The double salt recovered from the above reaction, is redissolved in a fresh portion of the organic solvent defined above and heated in the presence of an aliphatic amine to convert the double salt of N,N'-dimethyltriethylenediammonium dinitrate. A broad range of aliphatic amines may be employed to convert the double salt to the dinitrate product. In general, the effective amines include the primary, secondary and tertiary aliphatic amines having at least 4 and preferably from 5 to 30 carbon atoms. Morpholine and homologues of morpholine may also be employed and are about as effective as the cycloaliphatic amines. Specific amines which are effective include morpholine, amylamine, hexylamine, decylamine, dihexylamine, tributylamine, trihexylamine and the like. Amines boiling above 65° C. are preferred. The amount of amine employed is not critical but should be in excess of the amount of double salt being converted. Generally, 1.2 to 2 moles of the amine per mole of the double salt will be satisfactory.

The mixture of the double salt and amine is heated or refluxed to convert the double salt to the dinitrate. As the conversion is effected, ammonia is split off and is distilled from the reaction mixture. When the conversion is complete, the solution is cooled to effect precipitation of the N,N'-dimethyltriethylenediammonium dinitrate. Additional organic solvent may be added to the solution, if desired, to promote precipitation of the dinitrate.

The following example illustrates the practice of this invention:

*Example*

A solution of 12.8 grams (0.0424 mol) of N,N'-dimethyltriethylenediammonium dibromide in 150 milliliters of methanol and 8 milliliters of water was poured into a solution of 25.6 grams (0.32 mol) of ammonium nitrate dissolved in 200 milliliters of methanol and 4 milliliters of water. The intermediate N,N'-dimethyltriethylenediammonium dinitrate-ammonium nitrate formed and precipitated from the solution.

A solution consisting of 17.3 grams (0.05 mol) of the intermediate formed above, 7.5 grams (0.075 mol) cyclohexylamine, 9 milliliters of water and 100 milliliters of methanol was initially refluxed through a column for about 10 minutes followed by the removal of 5 milliliters of distillate. This treatment resulted in the conversion of the double salt to dimethyltriethylenediammonium dinitrate and the removal of free ammonia from the reaction mixture. The solution was cooled and diluted with 100 milliliters of butanol to precipitate the dinitrate product. A yield of 12.5 grams was obtained amounting to 94% of theory.

An analysis for $NH_4NO_3$ in the intermediate N,N'dimethyltriethylenediammonium dinitrate-ammonium nitrate prepared according to the above general method showed 22.9% $NH_4NO_3$ as compared to a theoretical value of 23.1%.

Obviously, many modifications of the foregoing invention may be made without departing from the spirit and scope thereof, and, therefore, only such limitations should be imposed as are indicated in the appended claims.

I claim:
1. A method for preparing N,N'-dimethyltriethylenediammonium dinitrate which comprises contacting an N,N'-dimethyltriethylenediammonium dihalide with a molar excess of ammonium nitrate in solution to effect the formation of the double salt N,N'-dimethyltriethylenediammonium dinitrate-ammonium nitrate, and refluxing said double salt with an aliphatic amine having 4 to 30 carbon atoms in solution to produce N,N'-dimethyltriethylenediammonium dinitrate.

2. A method for preparing N,N'-dimethyltriethylenediammonium dinitrate which comprises contacting N,N'-dimethyltriethylenediammonium dibromide with a molar excess of ammonium nitrate in solution in a $C_1$ to $C_3$ saturated primary aliphatic alcohol to effect the formation of the double salt, N,N'-dimethyltriethylenediammonium dinitrate-ammonium nitrate, and reacting said double salt with an aliphatic amine having 4 to 30 carbon atoms in solution in an aliphatic alcohol reaction medium at reflux temperature to effect the formation of N,N'-dimethyltriethylenediammonium dinitrate.

3. A process according to claim 2 in which said reaction medium is methanol.

4. A process according to claim 3 in which aqueous methanol is employed having 2% to 10% by volume of water.

5. A process according to claim 2 in which said amine is cyclohexylamine.

6. The composition

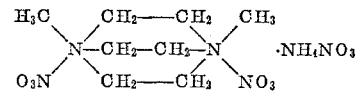

7. A method for preparing N,N'-dimethyltriethylenediammonium dinitrate which comprises contacting an N,N'-dimethyltriethylenediammonium dihalide with 2 to 5 mols of ammonium nitrate per mol of said dihalide in solution to effect the formation and precipitation of the double salt, N,N'-dimethyltriethylenediammonium dinitrate-ammonium nitrate, and recovering said double salt.

8. A method for preparing N,N'-dimethyltriethylenediammonium dinitrate which comprises contacting N,N'-dimethyltriethylenediammonium dibromide with 3 to 4 mols of ammonium nitrate per mol of said dibromide in solution in aqueous methanol to thereby effect the formation and precipitation of the double salt, N,N'-dimethyltriethylenediammonium dinitrate-ammonium nitrate, and recovering said double salt.

References Cited in the file of this patent
FOREIGN PATENTS

| | | |
|---|---|---|
| 159,562 | Australia | Nov. 2, 1954 |
| 735,631 | Great Britain | Aug. 24, 1955 |
| 798,488 | Great Britain | July 23, 1958 |